US008537719B2

(12) United States Patent
Chang et al.

(10) Patent No.: US 8,537,719 B2
(45) Date of Patent: Sep. 17, 2013

(54) WIRELESS COMMUNICATION NETWORK AND ROUTING METHOD

(75) Inventors: Shu-Hsin Chang, Tainan (TW); Pin-Chuan Liu, Hsinchu (TW); Chih-Yuan Yao, Minxiong Township (TW); Wei-Lun Tsai, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 839 days.

(21) Appl. No.: 12/616,394

(22) Filed: Nov. 11, 2009

(65) Prior Publication Data

US 2010/0165885 A1 Jul. 1, 2010

(30) Foreign Application Priority Data

Dec. 29, 2008 (TW) ................................ 97151209 A (51) Int. Cl.
*H04J 1/16* (2006.01)
*H04L 12/56* (2006.01)

(52) U.S. Cl.
CPC .................................... *H04L 45/48* (2013.01)
USPC ........... 370/256; 370/238; 370/254; 370/255; 370/310; 370/315; 370/328; 370/338; 370/351; 370/392; 370/400; 370/408; 370/501; 455/11.1; 455/73; 455/422.1; 455/423; 455/445

(58) Field of Classification Search
None
See application file for complete search history.

(56) References Cited

U.S. PATENT DOCUMENTS

| 5,412,654 | A | * | 5/1995 | Perkins .......................... 370/312 |
| 8,000,314 | B2 | * | 8/2011 | Brownrigg et al. ........... 370/351 |
| 2002/0145978 | A1 | * | 10/2002 | Batsell et al. ................. 370/238 |
| 2004/0213167 | A1 | * | 10/2004 | Garcia-Luna-Aceves et al. ............................. 370/254 |
| 2007/0286097 | A1 | | 12/2007 | Davies |

FOREIGN PATENT DOCUMENTS

CN 101197748 6/2008

OTHER PUBLICATIONS

OA dated Sep. 26, 2011 from corresponding application No. CN 200910003225.1.

* cited by examiner

*Primary Examiner* — Jae Y Lee
*Assistant Examiner* — Alixa A Guadalupe-Cruz
(74) *Attorney, Agent, or Firm* — Rabin & Berdo, P.C.

(57) ABSTRACT

A wireless communication network, including a destination node, a first node transmitting a first routing message, wherein the first node has a first routing table including a first entry for the destination node, and the first entry includes a first list field for child node(s). The network further includes a second node generating and transmitting a second routing message according to the first routing message, wherein the second routing message includes a second parent node field, and the second parent node field is marked as the first node that transmitted the first routing message. The first node further receives the second routing message and stores a first mark in the first list field for child node(s) of the first entry after determining that the second parent node field of the second routing message is marked as the first node, and the first mark denotes the second node.

20 Claims, 10 Drawing Sheets

FIG. 1A

| destination node | nexthop | metric | sequence number | install |
|---|---|---|---|---|
| $MH_1$ | $MH_2$ | 2 | $S406\_MH_1$ | $T001\_MH_4$ |
| $MH_2$ | $MH_2$ | 1 | $S128\_MH_2$ | $T001\_MH_4$ |
| $MH_3$ | $MH_2$ | 2 | $S564\_MH_3$ | $T001\_MH_4$ |
| $MH_4$ | $MH_4$ | 0 | $S710\_MH_4$ | $T001\_MH_4$ |
| $MH_5$ | $MH_6$ | 2 | $S392\_MH_5$ | $T002\_MH_4$ |
| $MH_6$ | $MH_6$ | 1 | $S076\_MH_6$ | $T001\_MH_4$ |
| $MH_7$ | $MH_6$ | 2 | $S128\_MH_7$ | $T002\_MH_4$ |
| $MH_8$ | $MH_6$ | 3 | $S050\_MH_8$ | $T002\_MH_4$ |

FIG. 1B

| relay | destination node | metric | sequence number |

WIRELESS COMMUNICATION NETWORK AND ROUTING METHOD

This application claims priority of Taiwan Patent Application No. 97151209, filed on Dec. 29, 2008, the entirety of which is incorporated by reference herein.

BACKGROUND OF THE INVENTION

1. Field of the Invention

The invention relates generally to wireless communication technology, and more particularly, to a wireless communication network and routing method that significantly reduces routing loads.

2. Description of the Related Art

For conventional wireless communication systems, routing messages are transmitted among mobile terminals (nodes) through the path arranged by a Destination-Sequenced Distance-Vector (DSDV) algorithm, so that each node may receive routing information with respect to specific destination nodes. To achieve efficient communication for nodes, the DSDV algorithm determines the shortest path to each specific destination node for every node in the network. However, when mobile users of a wireless communication system increase to an extreme level, the DSDV algorithmic calculations required and message flooding may paralyze the wireless communication system.

BRIEF SUMMARY OF THE INVENTION

The invention discloses a wireless communication network, comprising a first node transmitting a first routing message, wherein the first node has a first routing table comprising a first entry for a destination node, and the first entry comprises a first list field for child node(s). The wireless communication network further comprises a second node generating and transmitting a second routing message according to the first routing message, wherein the second routing message comprises a second parent node field, and the second parent node field is marked as the first node that transmitted the first routing message. The first node further receives the second routing message and stores a first mark in the first list field for child node(s) of the first entry after determining that the second parent node field of the second routing message is marked as the first node, and the first mark denotes the second node that transmitted the second routing message.

Furthermore, the invention discloses a routing method. The method comprises transmitting a first routing message generated by a first node to a second node, wherein the first node has a first routing table comprising a first entry for a destination node, and the first entry comprises a first list field for child node(s). The method further comprises generating and transmitting a second routing message at the second node according to the first routing message, wherein the second routing message comprises a second parent node field, and the second parent node field is marked as the first node that generated the first routing message. The method further comprises storing a first mark in the first list field for child node(s) of the first entry after determining that the second parent node field of the second routing message is marked as the first node, wherein the first mark denotes the second node that transmitted the second routing message.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
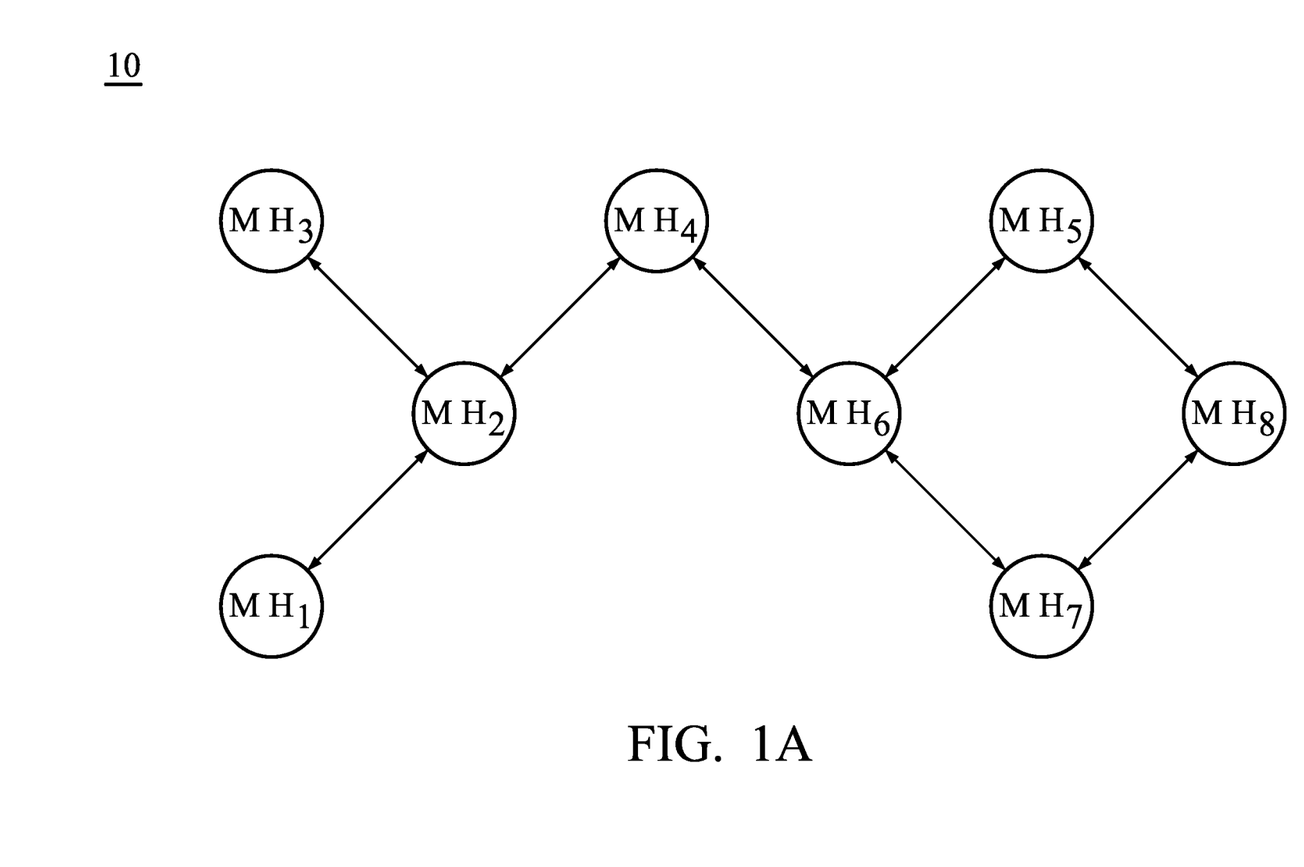
FIG. 1A shows a diagram of a wireless communication network.

FIG. 1A shows a diagram of a wireless communication network 10. The wireless communication network 10 may comprise eight nodes MH1 to MH8, wherein routing messages among the eight nodes MH1 to MH8 are transmitted by a DSDV mechanism. A routing table is initiated and maintained by each node to specify the routing information with respect to every node in the wireless communication network 10. For example, a routing table of the node MH4 is shown in FIG. 1B.

Figure 1B:
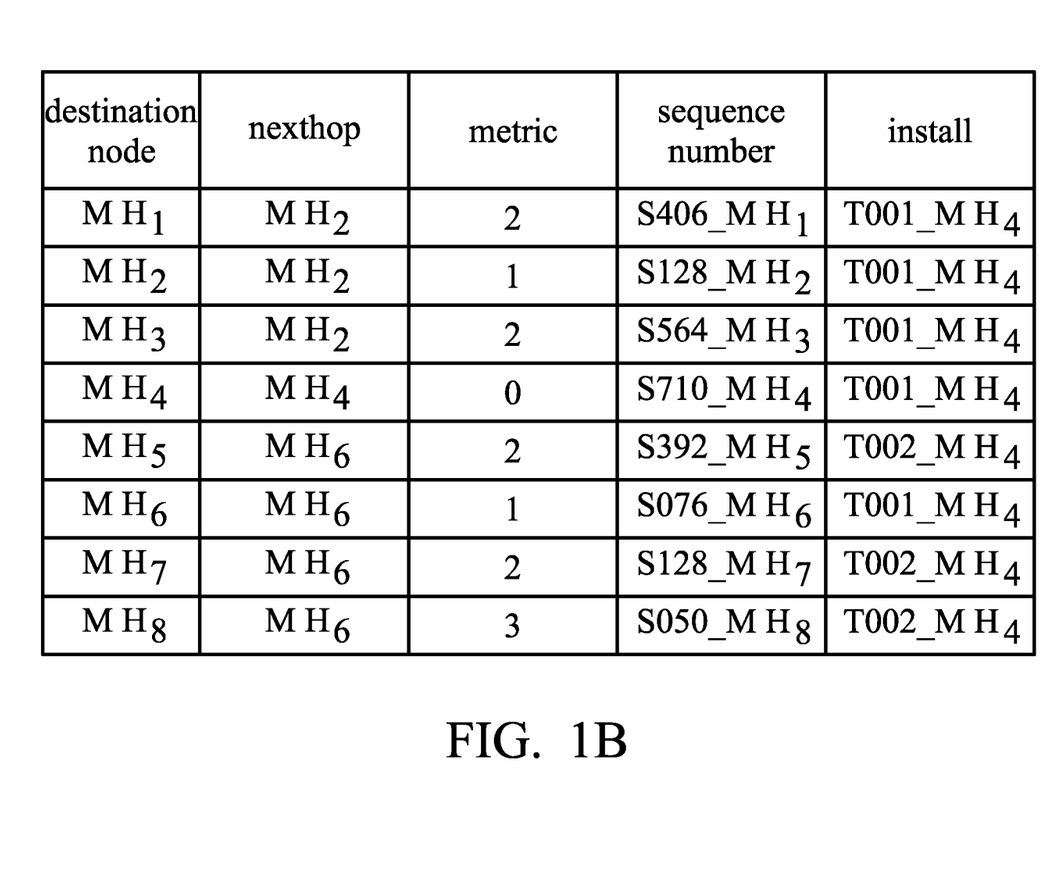
FIG. 1B shows a routing table of the node MH4 of the wireless communication network seen in FIG. 1A.

In FIG. 1B, the routing table may comprise eight entries respectively as the eight nodes MH1 to MH8. Each entry may comprise five fields: destination, nexthop, metric, sequence number and install. The destination field represents the destination node for transmitted data. The nexthop field represents the next transient node on the path to a specific destination node. The metric field represents the number of total transient nodes on the path to a specific destination node. The sequence number field represents the freshness for when a routing message is sent so that the most recent routing message is utilized. The install field represents the update time of a routing message.

For example, if the node MH1 is a destination node, then the next node from the node MH4 to the node MH1 is the node MH2. In addition, from the node MH4 to the node MH1, there are two transient nodes MH2 and MH1. Thus, a routing table maintained by each node specifies the routing information with respect to other nodes in the wireless communication network 10. Note that the "destination" mentioned above refers to the destination terminal for transmitted data, not for the destination of the routing message. The routing message is transmitted in an opposite direction with the transmitted data. A routing message format is shown in FIG. 2.

Figure 2:
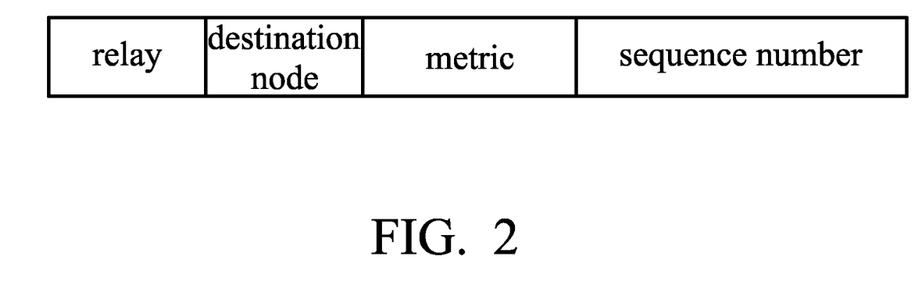
FIG. 2 shows a format of a routing message.

FIG. 2 shows a format of a routing message. A routing message may comprise four fields: relay, destination, metric and sequence number. The relay field represents a relay node of a routing message. The destination field represents a destination node that initializes a routing message. As for the metric and sequence number fields, they are the same as previously described for the routing table. For example, assume three nodes A, B and C in a wireless communication network, with node A being the destination node. In this case, when the destination node A starts and transmits an initial routing message to the node B, the destination node A fills the relay field of the initial routing message as the node A, the destination field as the node A, the metric field as 0, and the sequence number field as the current number plus 2. Upon reception of the initial routing message, the node B updates its routing table based on the filled contents and generates and transmits a corresponding routing message to the node C. In the routing message generated by the node B, the relay field is filled as the node B, the destination field as the node A, the metric field as 1, and the sequence number field remains the same. Thus, each node maintains its own routing table according to the received routing message, and further generates a routing message and passes the generated routing message on until the initial routing message started by the node A reaches all nodes within the network.

Based on the current routing structure, the invention constructs all nodes having the same destination node as a tree structure. As a result, the root node of the tree will be the destination node, and other nodes with the root as a destination node will be the branch nodes of the tree, as shown in FIG. 3.

Figure 3:
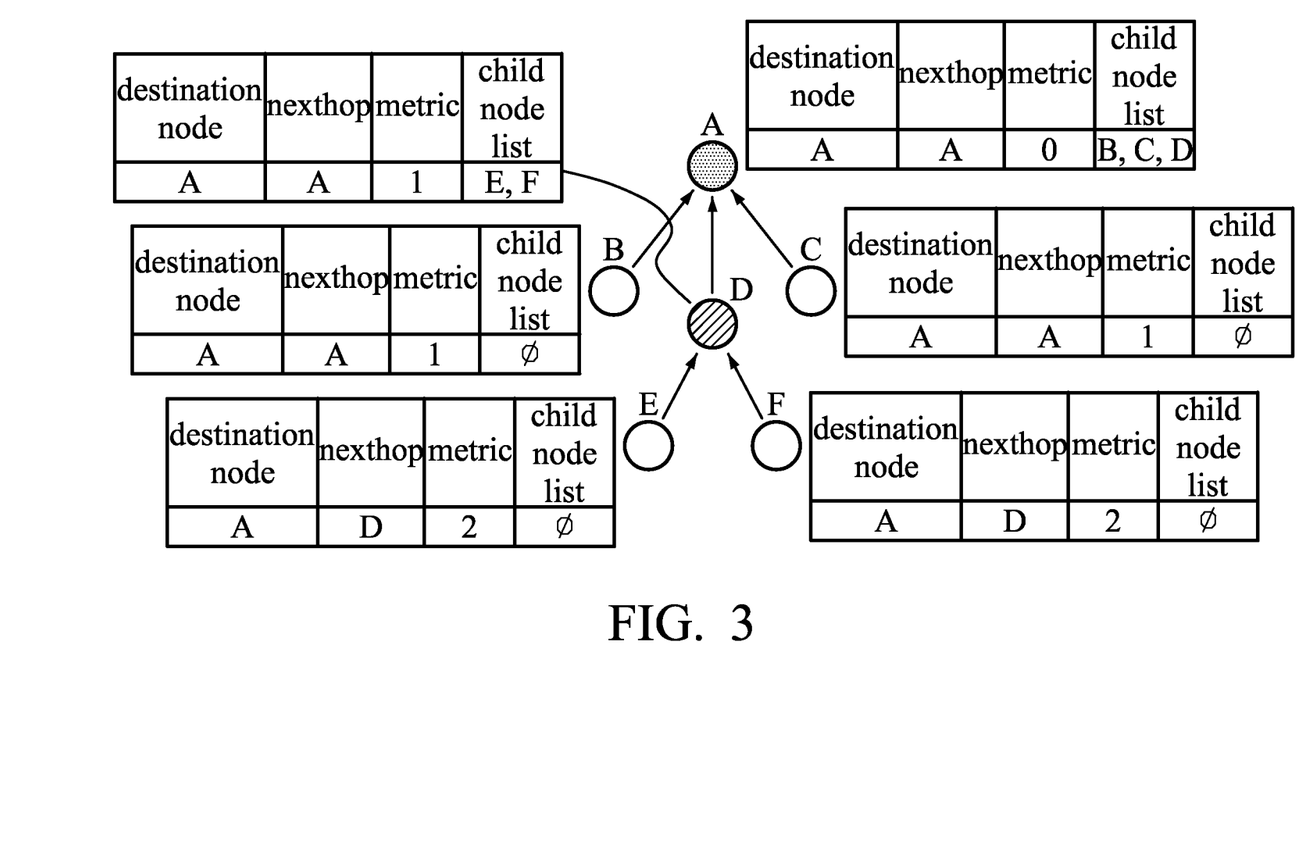
FIG. 3 shows a tree structure constructed by all nodes having the same destination node, according to an embodiment of the invention.

In FIG. 3, a tree structure constructed by all nodes having the same destination node is shown. FIG. 3 also shows the destination node A entries for all nodes. Herein, parent and child node(s) for individual nodes are recorded. Under the tree structure shown in FIG. 3, the node D is an intermediate node since it has nodes E and F as its child nodes. The nodes B, C, E and F are edge nodes since their list fields for child node(s) are empty. In other words, the present invention adds a child node (ChildList) field in the routing table for recording child nodes of each node in the tree structure. Furthermore, the present invention adds a parent field in the routing message for recording the parent node of the routing messages.

Figure 4A:
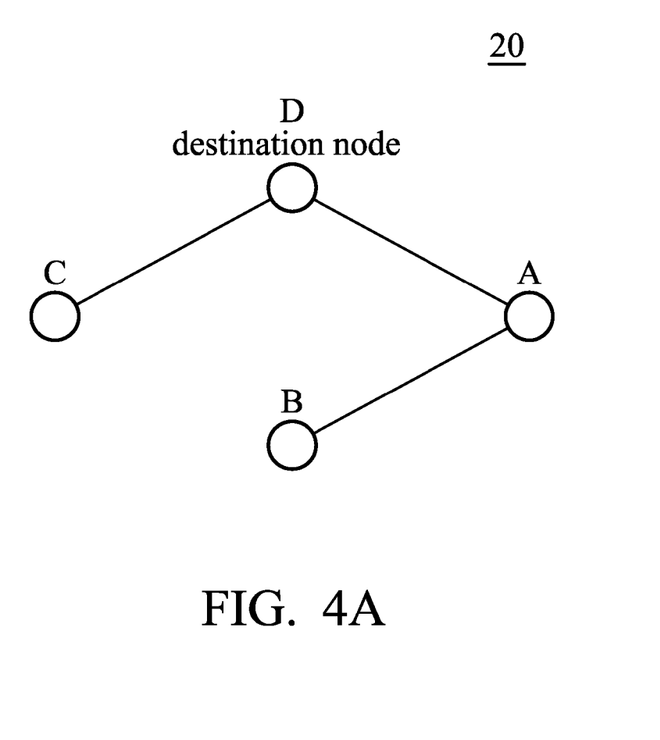
FIG. 4A shows a diagram of a wireless communication network according to an embodiment of the invention.

FIG. 4A shows a diagram of a wireless communication network 20 according to another embodiment of the invention. In FIG. 4A, four nodes A, B, C and D are shown. The node D is the destination node. Herein, parent and child node(s) for individual nodes are recorded. First, the destination node D broadcasts an initial routing message. In the initial routing message, the relay field is marked as the destination node D, the destination field as the destination node D, the metric field as 0, the sequence number field as the current destination node D sequence number plus 2, and the parent field appears empty (not marked). During the broadcast of the initial routing message, all nodes within the coverage of the destination node D may receive the initial routing message, including the node A.

Upon reception of the initial routing message, the node A firstly identifies the destination node according to the destination field of the initial routing message, which is the node D in this embodiment. Next, the node A determines whether an entry with the node D destination already exists in its own routing table. If so, the entry is updated according to the received initial routing message. If not, an entry with the node D destination is created in its routing table. The created entry may comprise six fields: destination, nexthop, metric, sequence number, install, and child node list. After the new entry is created, the node A marks the nexthop field of the new entry as the node D that transmitted the initial routing message, the metric field of the new entry as the metric recorded in the initial routing message (0, currently) plus 1, the sequence number field of the new entry as the sequence number recorded in the initial routing message, and the install field of the new entry as the current system time of the node A. The list field for child node(s) still remains empty, as no child node is recorded as being corresponded to the node A.

After the entry is updated, a routing message is generated from node A. The relay field of the routing message is marked as the node A, the destination field as the destination node D, the metric field as 1, the sequence number field as the same sequence number recorded in the entry of node D in the routing table, and the parent field as the destination node D that transmitted the initial routing message to the node A. Afterwards, the generated routing message is broadcast by the node A, and the nodes D and B may receive the routing message since they are both within the coverage of the node A. When the destination node D receives the routing message, the node D identifies the parent field of the routing message and determines that the destination node D itself has been regarded by the node A as its parent node. Therefore, the node D marks the list field for child node(s) of the entry with the node D destination as the node A. As a result, a parent-child relationship tree between the destination node D and the node A is created. As described above, the node B may also receive the routing message issued by the node A and update its routing table entry with the node D destination according to the received routing message. Note the metric value increases by 1 as the routing message is transmitted to a subsequent node.

According to the above description, the destination node D is the root node and also the parent node of the node A, and the node A is the parent node of the node B. However, the parent-child relationship may change as the nodes move around the network. For example, assume that a new node C enters the coverage of the destination node D and becomes the child node of the destination node D, with the node A still being the parent node of the node B. In this case, the destination node D will need to broadcast its routing message again since its connection to the neighboring nodes has changed (or since the exceeding of a certain time period). Upon reception of the routing message issued by the destination node D, the node C transmits the routing message to all nodes within its coverage. In this regard, for (1) the node B is within the coverage of the node C and has lost its communication with the node A, or (2) the node B is within the coverage of the node C and also remains communication with the node A, but due to some reasons, the routing message relayed by the node C arrives the node B earlier than the routing message relayed by the node A, in both cases the node B would immediately update its routing table according to the received routing message from the node C and transmit the routing message again. During the broadcast, the parent node field of the routing message is modified as the current node C rather than the previous node A. Thus, when the node A receives the routing message broadcast by the node B, the node A identifies the parent node field of the routing message and determines that the node A itself is not regarded by the node B as its parent node anymore, thereby removing the node B from the list field for child node(s) of its routing table node D entry. Similarly, when the node C receives the routing message broadcast by the node B, the node C identifies the parent node field of the routing message and determines that the node C itself is regarded by the node B as its parent node, thereby marking the node B into the list field for child node(s) of its routing table node D entry. Consequently, the nodes D, C and B form a new parent-child relationship tree structure, as shown in FIG. 4B.

Figure 4B:
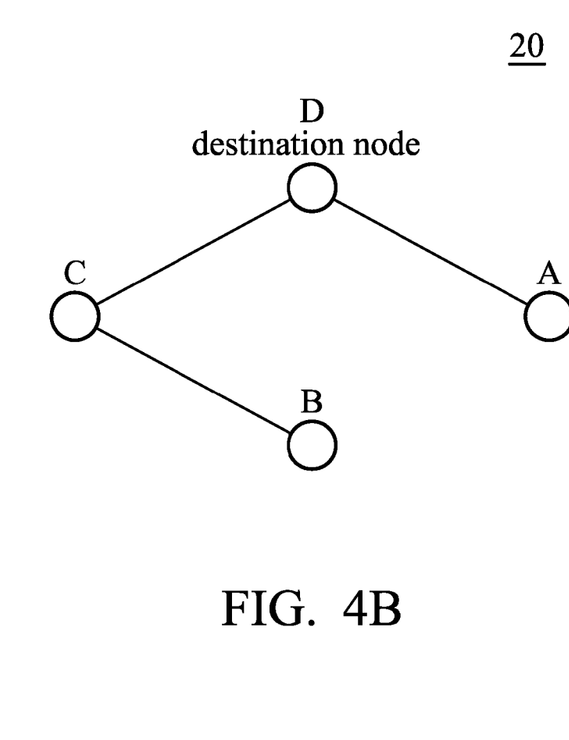
FIG. 4B shows a diagram of a wireless communication network according to another embodiment of the invention.

Referring to FIG. 4B, based on the connection status among the nodes D, C and B, assume that the node B is out of reach. Thus, the node C will retrieve each entry from its routing table. If the retrieved entry is the one with the node B destination, the list field for child node(s) of the entry is completely cleared. If the retrieved entry is the one with the list field for child node(s) comprising the node B, then the node B is removed from the field.

Figure 5A:
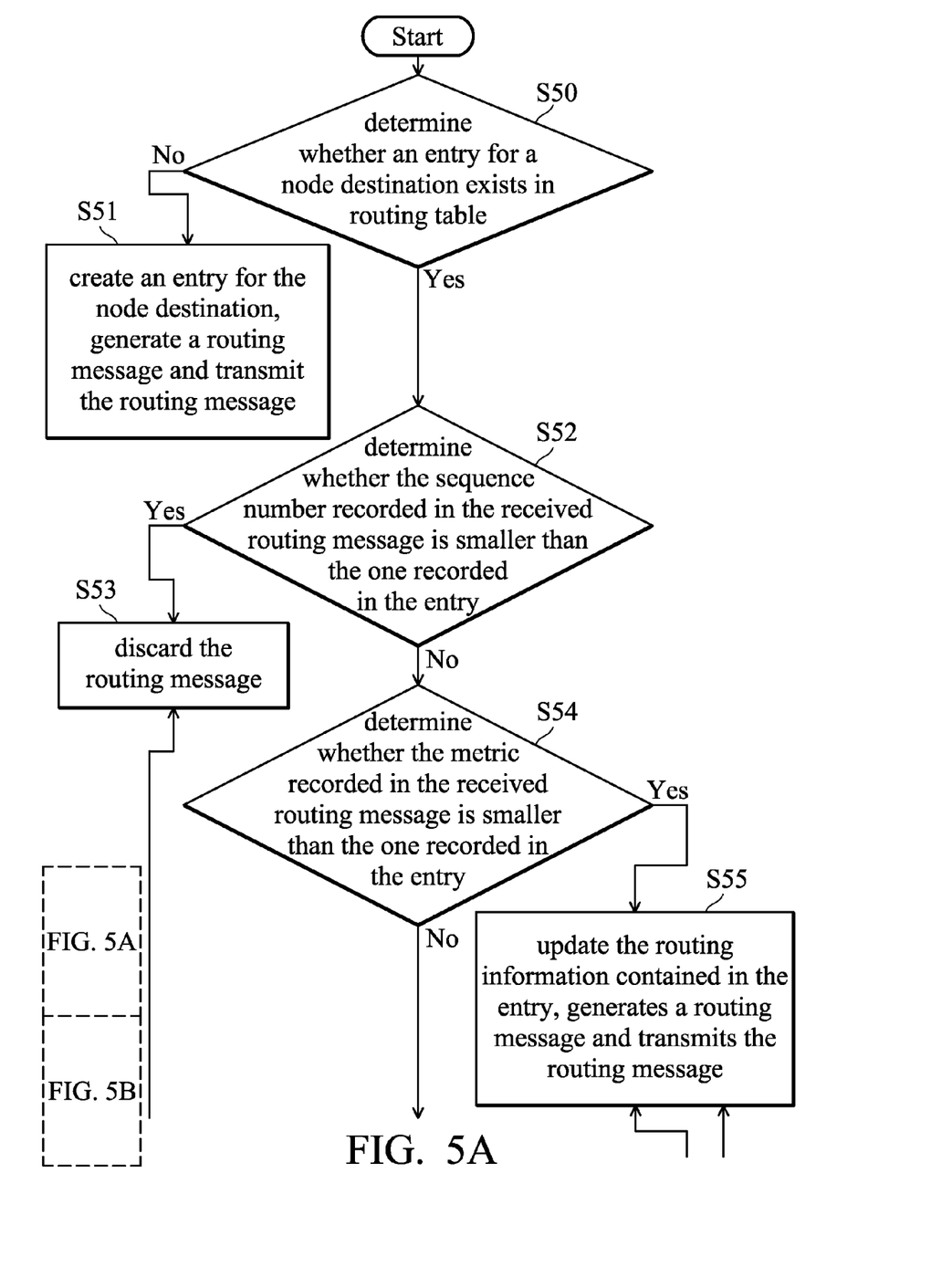
FIG. 5 shows an operation flowchart of routing messages under a tree structure according to an embodiment of the invention.
Figure 5B:
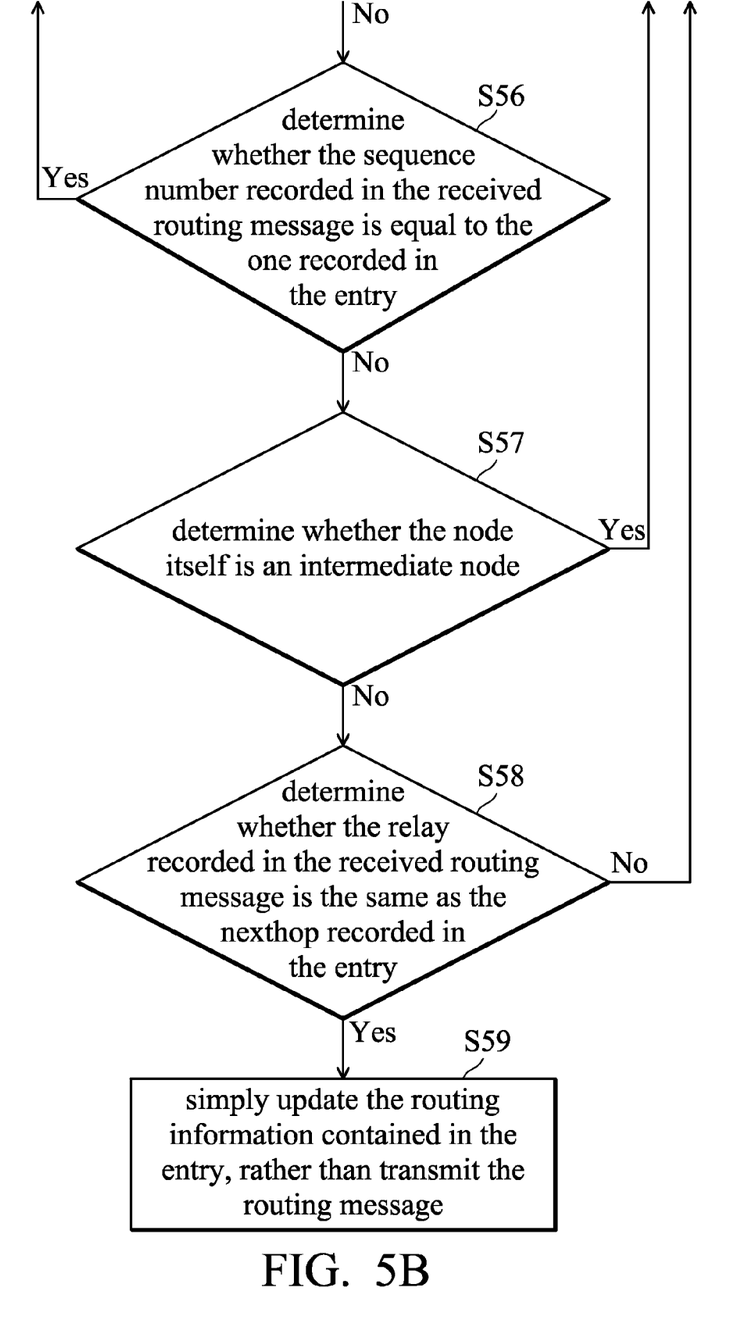

FIG. 5 shows an operation flowchart of routing messages under a tree structure according to an embodiment of the invention. First, assume that the node A receives a node D routing message from the node B, the node A firstly determines whether an entry for the node D destination exists in its routing table (step S50). If not, an entry for the node D destination is created, and a routing message is generated by the node A and the routing message is further transmitted to downstream nodes (step S51). If so, the procedure continues. In the next step, the node A determines whether the sequence number recorded in the routing message received from the node B is smaller than the one recorded in the entry (step S52). If so, the routing message is old (i.e. the routing message is not the latest one), so it is discarded (step S53). If not, the routing message is not old, so the procedure continues. In the next step, the node A determines whether the metric recorded in the routing message received from the node B is smaller than the one recorded in the entry (step S54). If so, there exists a shorter path to the destination node D, so the node A updates the routing information contained in the entry, generates a corresponding routing message and transmits the routing message to downstream nodes (step S55). If not, no shorter path to the destination node D exists, so the procedure continues. In the next step, the node A determines whether the sequence number recorded in the routing message received from the node B is equal to the one recorded in the entry (step S56). If so, the node A has already received the routing message with the same sequence number from other nodes other than the node B, and no shorter path to the destination node D exists, so the procedure goes back to step S53, discarding the routing message. If not, the procedure continues. In the next step, the freshest routing message doesn't provide a shorter path, so the node A determines whether the node A itself is an intermediate node according to the list field for child node(s) of the entry (step S57). If so, it indicates that there is a downstream child node(s) which requires the node A to transmit updated routing messages. Thus, the node A updates the routing information of the entry, generates a corresponding routing message and transmits the routing message to the following nodes (step S55). If not, the procedure continues. In the next step, the node A is an edge node and the received freshest routing message doesn't provide a shorter path, so the node A determines whether the relay recorded in the routing message received from the node B is the same as the nexthop recorded in the entry (step S58). If so, the node A continues its parent-child relationship with the node B, so the node A only needs to update the routing information contained in the entry, rather than transmit the routing message to the following nodes (step S59). If not, the node A now regards the node B as its new parent node, so the node A not only updates the routing information contained in the entry but also transmits the routing message on (step S55). The transmission of the routing message is to inform previous and current parent nodes of the node A to simultaneously update their list fields for child node(s) of the destination node entry.

Figure 6A:
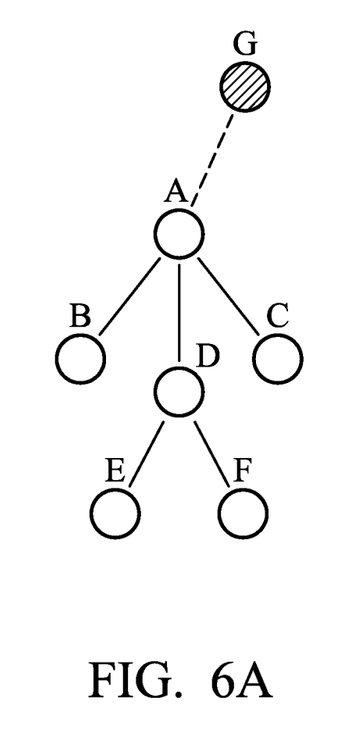
FIG. 6A shows an event where a new node G is detected to enter the coverage of the node A.
Figure 6B:
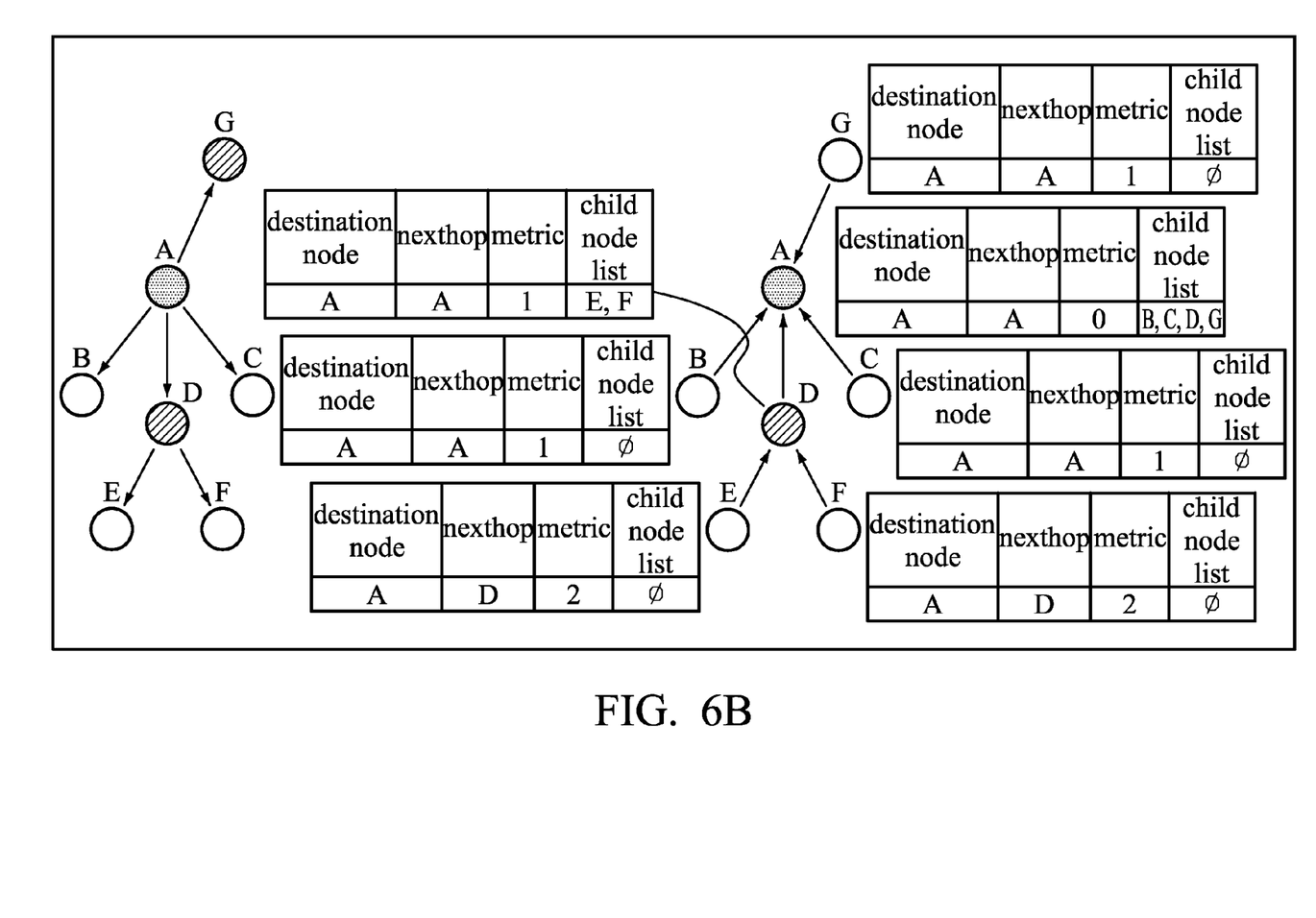
FIG. 6B shows an operation of the node A in response to the detection of a new node G.
Figure 6C:
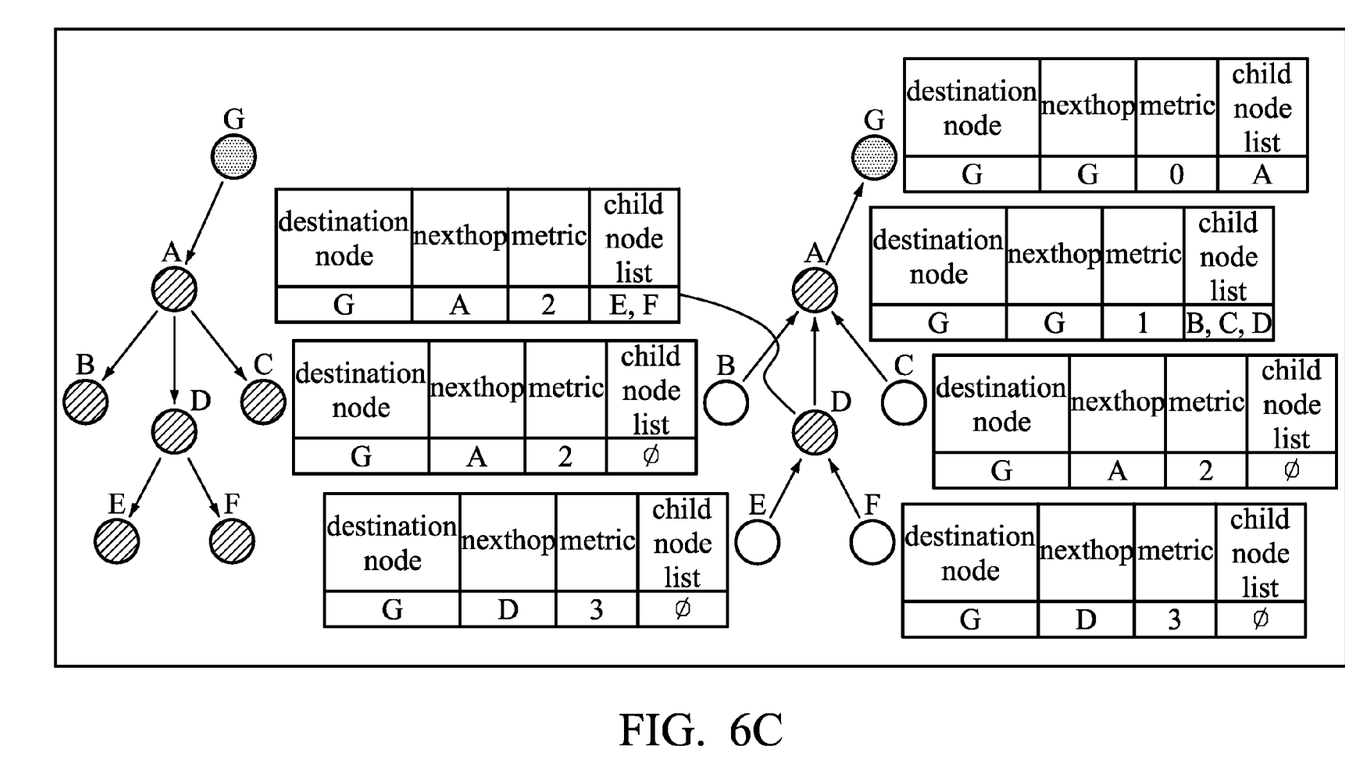
FIG. 6C shows an operation of the node G in response to the detection of a new node A.

Referring to FIG. 6A, with the same tree structure shown in FIG. 3, assume that a new node G is detected to enter the coverage of the node A. Thus, when a new node is found by the node A, the node A adds 2 to a current sequence number and broadcasts a routing message, as shown in FIG. 6B. In FIG. 6B, when a routing message is issued by the node A, only the intermediate node D and the new node G are required to transmit the routing message. In other words, the other edge nodes B, C, E and F are not required to do so. By the time the node A routing message reaches all nodes within the network and each node is triggered by the routing message to update their individual routing table entries with the node A destination, all paths towards the destination node A within the network will be re-converged as a new tree structure with the node A being the root node. As a result, the root node A has child nodes B, C, D and G. The node D has child nodes E and F, so the node D is an intermediate node. Other nodes B, C, E, F and G are edge nodes. In addition, when the node A broadcasts its routing message, from the node G, a new node A is found to enter its coverage. In response to the event, the node G adds 2 to a current sequence number and broadcasts a routing message again, as shown in FIG. 6C. In FIG. 6C, when the node G broadcasts its routing message, other nodes within the network are required to transmit the routing message since the node G is a new node. By the time the node G routing message reaches all nodes within the network and each node is triggered by the routing message to create individual routing table entries with the node G destination, all paths towards the destination node G within the network will be converged as a tree structure with the node G being the root node. As a result, the root node G has a child node A. The node A has child nodes B, C and D, so the node A is an intermediate node. The node D has child nodes E and F, so the node D is also an intermediate node. Other nodes B, C, E and F are edge nodes.

Note that only the intermediate node(s) under the tree structure is required to transmit the routing message when the network topology changes. In comparison with the traditional DSDV algorithm where every node is required to transmit the routing message in an event of network topology change, the invention significantly reduces the transmission of routing messages; especially for a network having many nodes.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A wireless communication network, comprising:
   a destination node, wherein a destination identifying information corresponds to the destination node;
   a first node transmitting a first routing message, wherein a first identifying information corresponds to the first node,
   wherein the first node has a first routing table, the first routing table including a first entry corresponding to the destination node, the first entry including a first child node field,
   wherein the first routing message includes at least a first relay field and a first destination node field, and the first relay field is marked to include the first identifying information and the first destination node field is marked to include the destination identifying information;
   a second node having a second routing table, wherein a second identifying information corresponds to the second node,
   wherein the second routing table includes a second entry corresponding to the destination node, the second entry including a second nexthop field and a second child node field, wherein the second node receives the first routing message, marks the second nexthop field to include the first identifying information, and generates and transmits a second routing message according to the first routing message, further wherein the second routing message includes a second parent node field, a second relay field, and a second destination node field, and the second parent node field is marked to include the first identifying information, the second relay field is marked to include the second identifying information and the second destination node field is marked to include the destination identifying information, further wherein the first node receives the second routing message, and after determining that the first identifying information is included in the second parent node field, stores a first mark in the first child node field, wherein the first mark represents the second identifying information, that corresponds to the second node, that is marked in the second relay field; and a third node having a third routing table, wherein a third identifying information corresponds to the third node, wherein the third routing table includes a third entry corresponding to the destination node, the third entry including a third nexthop field and a third child node field, further wherein the third node receives the second routing message, and marks the third nexthop field to include the second identifying information marked by the second relay field.

2. The wireless communication network as claimed in claim 1, wherein the destination node is the first node.

3. The wireless communication network as claimed in claim 1, wherein the third node generates and transmits a third routing message in accordance with the second routing message, and the third routing message includes a third parent node field, a third relay field, and a third destination node field, the third parent node field is marked to include the second identifying information marked in the second relay field, and the third relay field is marked to include the third identifying information, the third destination node field is marked to include the destination identifying information, the second node further receives the third routing message, and determines that the third parent node field is marked as the second identifying information and then stores a second mark in the second child node field, wherein the second mark represents the third identifying information marked in the third relay field.

4. The wireless communication network as claimed in claim 3, further comprising a fourth node transmitting a fourth routing message, wherein a fourth identifying information corresponds to the fourth node, wherein the fourth node has a fourth routing table, the fourth routing table including a fourth entry corresponding to the destination node, the fourth entry including a fourth child node field.

5. The wireless communication network as claimed in claim 4, wherein the fourth node transmits the fourth routing message and the fourth routing message includes the fourth identifying information, wherein the third node further receives the fourth routing message, and generates and transmits a fifth routing message according to the fourth routing message, the fifth routing message being received by the second node and the fourth node, and wherein the fifth routing message includes a fifth parent node field, the fifth parent node field is marked to include, based upon the fourth routing message, the fourth identifying information.

6. The wireless communication network as claimed in claim 5, wherein the fourth node determines from the fifth routing message that the fifth parent node field includes the fourth identifying information, and then stores a fourth mark in the fourth child node field, wherein the fourth mark represents the third identifying information.

7. The wireless communication network as claimed in claim 5, wherein the second node determines from the fifth routing message that the fifth parent node field does not include the second identifying information, and then the second mark representing the third identifying information stored in the second child node field is cleared.

8. The wireless communication network as claimed in claim 1, wherein the first entry further comprises a first nexthop field, and after the first node receives an initial routing message, upon which the first routing message is based, from the destination node, the first nexthop field is marked to include the destination identifying information.

9. The wireless communication network as claimed in claim 3, wherein the destination node transmits the initial routing message when detecting a new node.

10. The wireless communication network as claimed in claim 1, wherein the second node further generates and transmits a fourth routing message, and the fourth routing message includes a fourth relay field and a fourth destination node field, wherein the third node further receives the fourth routing message, and based on the fourth relay field and the third child node field, determines whether to transmit a corresponding routing message according to the fourth routing message.

11. A routing method, comprising:
providing a destination node having a destination identifying information corresponding thereto, a first node having a first identifying information corresponding thereto, a second node having a second identifying information corresponding thereto and a third node having a third identifying information corresponding thereto, wherein the first node has a first routing table, the first routing table including a first entry corresponding to the destination node, the first entry including a first child node field, wherein the second node has a second routing table, the second routing table including a second entry corresponding to the destination node, the second entry including a second nexthop field and a second child node field, wherein the third node has a third routing table, the third routing table including a third entry corresponding to the destination node, the third entry including a third nexthop field and a third child node field;

generating a first routing message by the first node, wherein the first routing message includes at east a first relay field and a first destination node field, and the first relay field is marked to include the first identifying information and the first destination node field is marked to include the destination identifying information;

transmitting the first routing message;
receiving the first routing message by the second node;
based on the first routing message, marking, by the second node, the second nexthop field to include the first identifying information in accordance with the first routing message;

based on the first routing message, generating a second routing message by the second node, wherein the second routing message includes a second parent node field, a second relay field, and a second destination node field, and the second parent node field is marked as the first identifying information, the second relay field is marked as the second identifying information and the second destination node field is marked as the destination identifying information;

transmitting the second routing message by the second node;

receiving the second routing message by the first node and the third node;

storing a first mark, by the first node, in the first child node field after determining that the second parent node field is marked as the first identifying information, wherein the first mark represents the second identifying information marked by the second relay field; and based on the second routing message, marking, by the third node, the third nexthop field as the second identifying information marked by the second relay field.

12. The routing method as claimed in claim 11, wherein the destination node is the first node.

13. The routing method as claimed in claim 11, further comprising:

based on the second routing message, generating, by the third node, a third routing message, wherein the third routing message includes a third parent node field, a third relay field, and a third destination node field, and wherein the third parent node field is marked as the second identifying information that is transmitted in the second relay field of the second routing message, the third relay field is marked as the third identifying information and the third destination node field is marked as the destination identifying information;

transmitting the third routing message;

receiving the third routing message by the second node;

determining, by the second node, that the third parent field included in the third routing message is marked as the second identifying information; and after the determining by the second node, storing a second mark in the second child node field, wherein the second mark represents the third identifying information marked by the third relay field.

14. The routing method as claimed in claim 13, further comprising:

providing a fourth node having fourth identifying information corresponding thereto and a fourth routing table, the fourth routing table including a fourth entry corresponding to the destination node, the fourth entry including a fourth child node field; and transmitting a fourth routing message generated by the fourth node.

15. The routing method as claimed in claim 14, wherein the fourth routing message includes the fourth identifying information, the method further comprising:

receiving the fourth routing message by the third node;

generating a fifth routing message, by the third node, according to the fourth routing message, wherein the fifth routing message includes a fifth parent node field, the fifth parent node field being marked as the fourth identifying information in the fourth routing message;

transmitting the fifth routing message; and receiving the fifth routing message by the second node and the fourth node.

16. The routing method as claimed in claim 15, further comprising:

determining, by the fourth node, from the received fifth routing message that the fifth parent node field is marked as the fourth identifying information; and after the determining by the fourth node, storing, by the fourth node, a fourth mark in the fourth child node field, wherein the fourth mark represents the third identifying information.

17. The routing method as claimed in claim 15, further comprising:

determining, by the second node, that the fifth parent node field is not marked as the second identifying information; and after the determining by the second node that the fifth parent node field is not marked as the second identifying information, the second mark representing the third identifying information in the second child node field is cleared.

18. The routing method as claimed in claim 11, wherein the first entry further includes a first nexthop field, the method further comprising:

transmitting an initial routing message from the destination node;

receiving the initial routing message by the first node; and based on the initial routing message, marking, by the first node, the first nexthop field to include the destination identifying information.

19. The routing method as claimed in claim 18, further comprising:

providing a new node;

detecting, by the destination node, the new node; and transmitting, by the destination node, an initial routing message when the new node is detected.

20. The routing method as claimed in claim 11, further comprising:

generating, by the second node, a fourth routing message that includes a fourth relay field and a fourth destination node field;

transmitting the fourth routing message; and receiving the fourth routing message by the third node, determining, by the third node, based upon the fourth relay field and the third child node field, whether to transmit a corresponding routing message according to the fourth routing message.

* * * * *